United States Patent [19]

Gallington

[11] Patent Number: 5,448,963
[45] Date of Patent: Sep. 12, 1995

[54] HYDROFOIL SUPPORTED PLANING WATERCRAFT

[76] Inventor: Roger W. Gallington, 23913 6th Ave. S., Des Moines, Wash. 98198

[21] Appl. No.: 306,383

[22] Filed: Sep. 13, 1994

[51] Int. Cl.[6] ............................................. B63B 1/24
[52] U.S. Cl. ................................... 114/274; 114/280
[58] Field of Search ............................ 114/274–282, 114/291

[56] References Cited

U.S. PATENT DOCUMENTS

| | | | |
|---|---|---|---|
| 3,343,513 | 9/1967 | Bader | 114/282 |
| 3,464,377 | 9/1969 | Von Schertel | 114/278 |
| 3,651,775 | 3/1972 | Kock . | |
| 3,765,356 | 10/1973 | Cook . | |
| 3,881,438 | 5/1975 | Jones . | |
| 3,964,417 | 6/1976 | Williams . | |
| 3,977,348 | 8/1976 | Bordat . | |
| 4,237,810 | 12/1980 | Westfall | 114/272 |
| 4,517,912 | 5/1985 | Jones | 114/275 |
| 4,597,742 | 7/1986 | Finkl | 440/61 |
| 4,606,291 | 8/1986 | Hoppe | 114/61 |
| 4,628,853 | 12/1986 | Hoyt | 114/274 |
| 4,649,851 | 3/1987 | April | 114/271 |
| 4,665,853 | 5/1987 | Gerdsen | 114/61 |
| 4,711,195 | 12/1987 | Shutt | 114/274 |
| 4,862,820 | 9/1989 | Guezou | 114/278 |
| 4,896,621 | 1/1990 | Coles | 114/274 |
| 4,915,048 | 4/1990 | Stanford | 114/56 |
| 4,926,773 | 5/1990 | Manor | 114/61 |
| 4,951,591 | 8/1990 | Coles | 114/274 |
| 4,962,718 | 10/1990 | Gornstein | 114/274 |
| 5,027,737 | 6/1991 | Duffty | 114/270 |
| 5,063,868 | 11/1991 | Flnk | 114/56 |

FOREIGN PATENT DOCUMENTS 13896  1/1988  Japan .................... 114/281

OTHER PUBLICATIONS

"Hydrofoil Development & Applications" by John Meyer & James Wilkins Jr.
"Hybrid Hydrofoil Technology Applications" by John Meyer.
"Optimized Designs For Stepped Planing Monohulls & Catamarans" By Eugene Clement & Joseph Koelbel.

*Primary Examiner*—Jesus D. Sotelo
*Attorney, Agent, or Firm*—William G. Forster

[57] ABSTRACT

A passively controlled hydrofoil supported planning watercraft having a conventional hull with an integrally formed step. The watercraft includes a centrally located, fully submerged main lifting foil. The main lifting foil is fixed and non-movable, and is attached to the hull along the centerline keel such that its line of action acts substantially through the longitudinal center of gravity of the watercraft. The watercraft further includes a rearwardly located stabilizing foil fixed to a stabilizer strut which is pivotally attached to the stern of the watercraft. A stabilizer strut so attached pivots fore and aft to control watercraft trim angle. Additionally, the stabilizer strut is rotatable about a substantially vertical axis for steering and roll control, and includes a trailing edge upper rudder for yaw control.

19 Claims, 4 Drawing Sheets

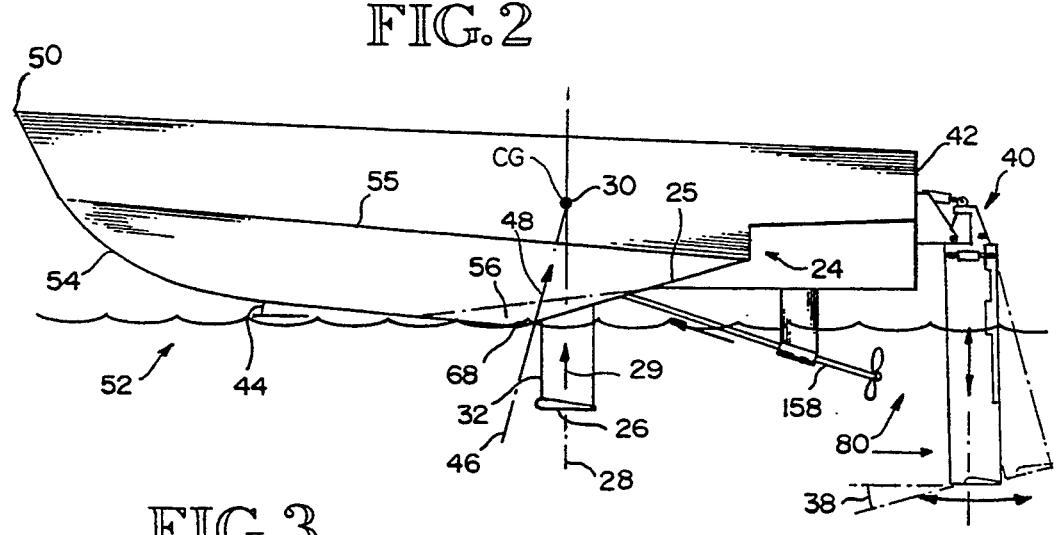
FIG. 2
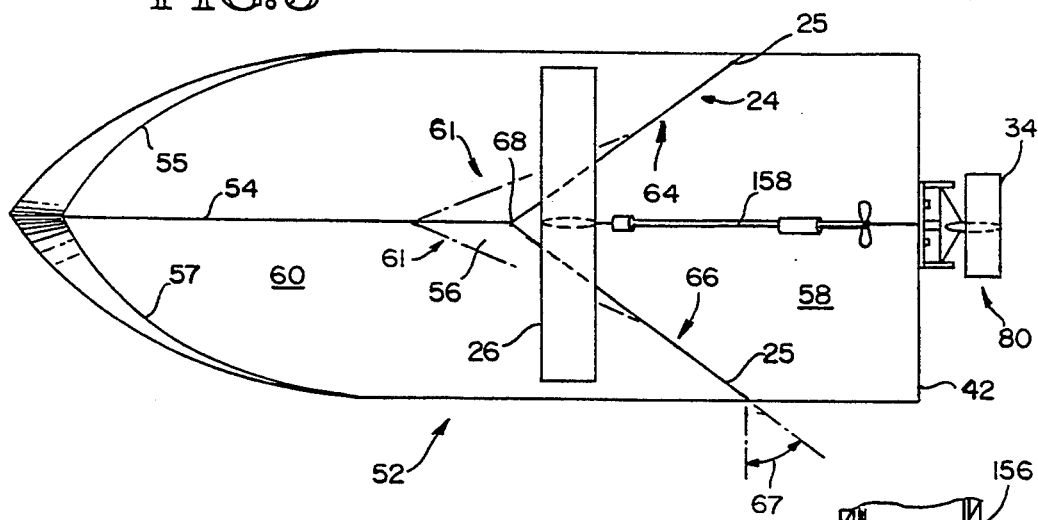
FIG. 3
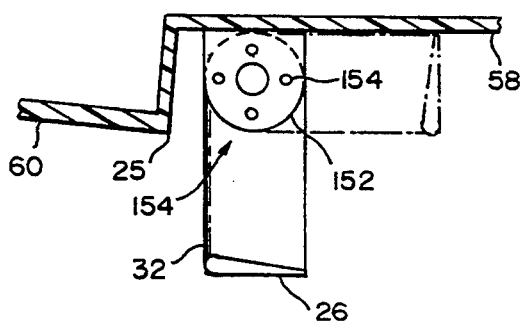
FIG. 4
FIG. 5

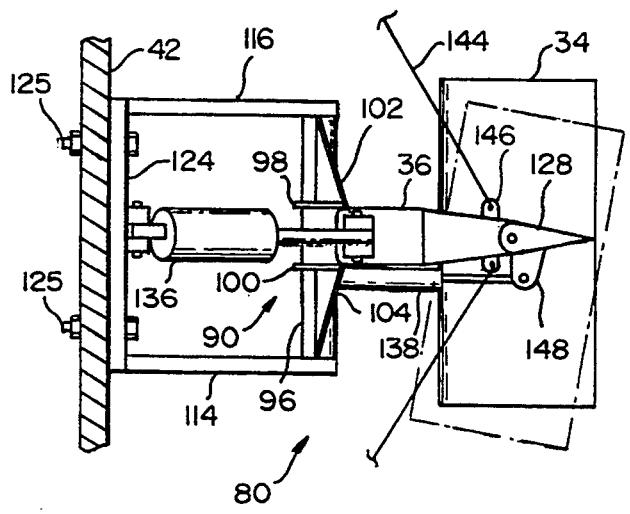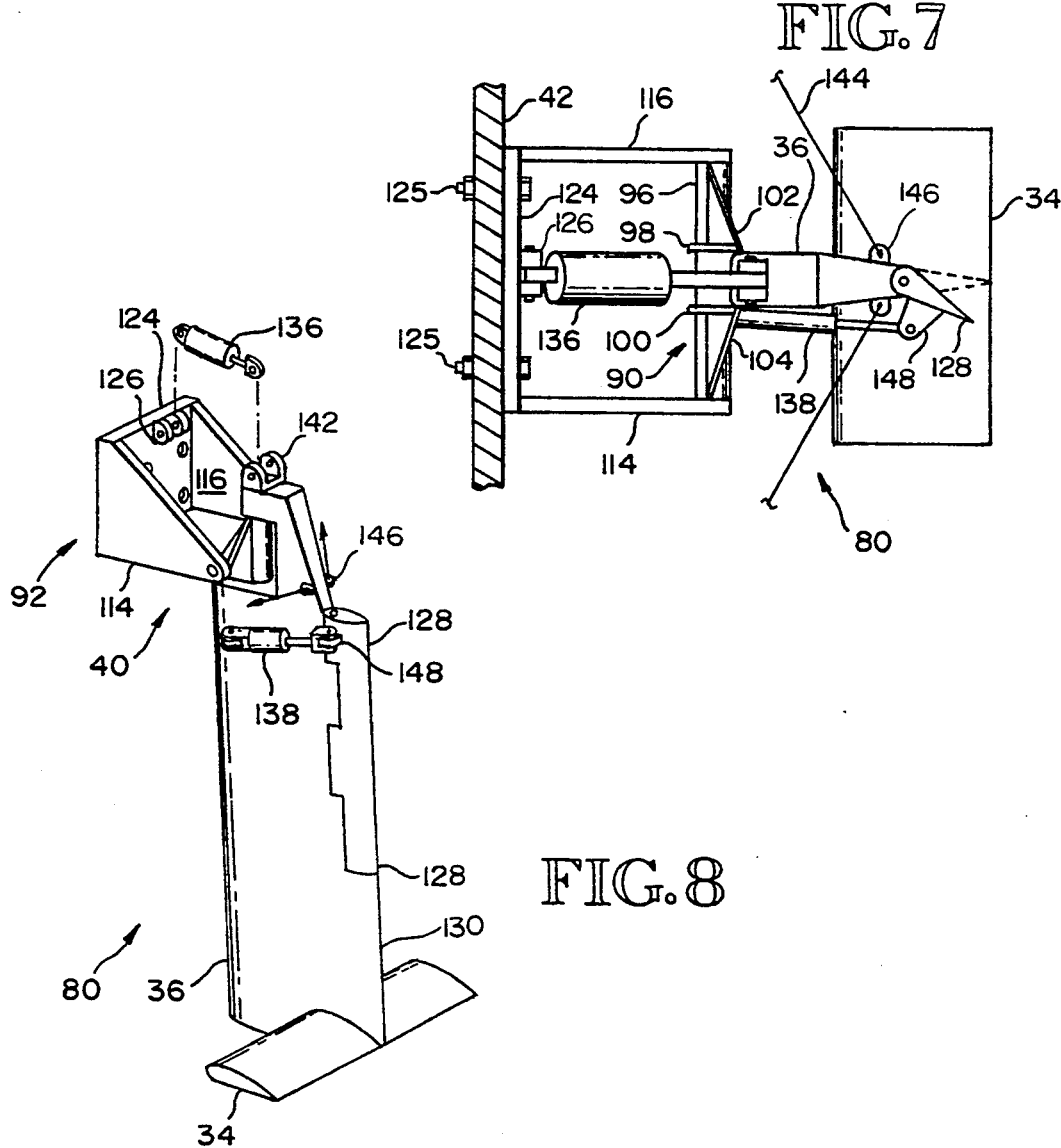

HYDROFOIL SUPPORTED PLANING WATERCRAFT

BACKGROUND OF THE INVENTION

This invention relates generally to planing watercraft, and more particularly to such watercraft that employ hydrofoils for dynamic support thereof.

A primary concern of boat designers is the handling and performance characteristics of watercraft under a variety of adverse conditions including rough water, wave action against the hull, and drag produced from the flow of water past the hull. Optimum performance under these adverse conditions is a priority of the designer, and is traditionally accomplished by either hydrodynamic hull design, or less commonly by the incorporation of hydrofoils thereto.

Typically, most planing watercraft comprise a hydrodynamically designed hull that rides directly on the water. These watercraft depend entirely on water pressure against the hull for dynamic support at cruising speeds. Because these watercraft are designed to be in constant contact with the water, their performance is directly effected by rough water and drag.

More specifically, a planing boat supported entirely by water pressure against its hull, is exposed to wave forces that cause the boat to pitch up when waves are engaged. The pitching is caused because waves usually act on the forward section of the boat, somewhere between the bow and the center of gravity "C.G." Accordingly, the force of individual waves hitting the hull forward of the C.G. causes a bow up rotation, i.e. pitching movement. In this way, as a boat travels over the water, it repeatedly pitches in response to engaging waves. Such repeated pitching is the primary source of a rough ride.

In addition, when a planing boat travels on the water, a portion of the hull is usually in contact with the water. This portion of hull is referred to as the wetted area, and is the primary source of drag that a boat must overcome. Because reduction of wetted area translates to reduction of drag, one objective of boat designers is to reduce wetted surface area of the boat's hull at cruising speeds.

One type of hull, designed to give pitch stability, and thus a smooth ride in rough water, is a deep-V shaped hull. Hulls having a deep-V shape, cut through waves with a minimum of pitching. However, because deep-V designs have a larger wetted surface, more drag is generated thereby requiring larger power plants and/or slower speeds. In addition, deep-V type hulls are somewhat less stable and tend to roll from side to side more than boats having flatter bottoms.

One way boat designers can minimize the effect of wave action and also reduce the wetted surface area of the hull is to incorporate hydrofoils in the boat's design. Boats that employ hydrofoils "foils" for dynamic support at cruising speed are well known in the art. Boat designers have, for many years, utilized a number of different arrangements of hydrofoils to reduce the effect of waves, and to reduce the power required to attain modestly high speeds. Generally, hydrofoils are classified in one of two groups: (1) surface piercing foils, and (2) fully submerged foils.

Surface piercing foils are the simplest in design because they are generally self-stabilizing in roll, and in height above the 'water. However, because a portion of the surface piercing foil is always in contact with the water surface, and therefore the waves, this type of foil is more susceptible to adverse effects of wave action that results in a rough ride.

In contrast, fully submerged foils have no contact with surface waves and therefore a smoother ride can be attained in rough water. Boat designers have found, however, that this type of design, where the hull raises out of the water and thus becomes airborne, is generally not passively stable, i.e., it is not self-stabilizing. Consequently, to maintain a specified height above water and a straight and level course, a boat having totally submerged foils usually requires an independent control system to adjust the angle of attack of the foil surface. This control is much like that of an aircraft requiring multiple control surfaces.

Because of these problems, the use of hydrofoils to improve watercraft performance has been somewhat limited. Several early designs incorporated hydrofoils to enhance the performance of watercraft having hulls designed to remain in contact with the water. For example, U.S. Pat. No. 3,964,417 to Williams et al. employs a forward planing hull along with two rear hydrofoils that provide additional lift. Because the hull of this design is somewhat flat and never leaves the water, the effect of waves and rough water on the front portion of the hull is substantial. Similarly, U.S. Pat. No. 3,881,438 to Jones incorporates front and rear hydrofoils to a hull designed to stay in contact with the water.

Subsequent similar designs include U.S. Pat. No. 4,665,853 to Gerdsen et al which discloses catamaran "side-by-side" hulls with front and rear hydrofoils that span between the hulls; U.S. Pat. No. 4,606,291 to Hoppe which also discloses a catamaran type hull with front and rear foils for enhanced dynamic support; and finally U.S. Pat. No. 4,915,048 to Stanford which discloses a front foil to generate a downward force, a rear foil to generate an upward force, and a rearwardly disposed step to cooperate with a stern pressure release zone.

In each of the above noted watercraft, wave impact on the hull occurs repeatedly and is well forward of the "center of gravity." Accordingly, an upward pitching takes place which results in a rough ride. To eliminate such pitching in watercraft, some designers turned to fully submerged hydrofoils incorporated on hulls that rise completely out of the water at cruising speed. As a result of the hull being completely separated from the water, wave action, and therefore pitching is minimized. However, with this type of design, a complex control system is usually required for longitudinal and lateral stability.

For example, U.S. Pat. No. 4,237,810 to Westfall discloses a hydrofoil boat design that employs fully submerged foils for high efficiency longitudinal stability is maintained by a control mechanism that exerts pressure on the front strut to move an aerodynamic horizontal stabilizer which controls the pitch altitude.

Similarly, U.S. Pat. No. 4,962,718 to Gornstein discloses a boat with fully-submerged hydrofoils. Because of the location and distance of the foils from the hull, this boat design is not laterally or longitudinally stable in the absence of a stabilizing control system.

Finally, U.S. Patent to Cook discloses a watercraft having totally submerged foils attached to a hull that raises completely out of the water. Like Westfall and Gornstein, however, stability is maintained through a system requiring complex manipulation of foils.

As seen from the above, watercraft designs that incorporate hydrofoils for improved performance generally fall into one of two groups. Briefly, a first group employs a design where the hull maintains substantial contact with the water. Because of such contact, this design is susceptible to rough water conditions that cause pitching instability. A second general group comprise hulls designed to raise away from the water to reduce wave action from rough water, and to reduce wetted area drag. As noted, however, this type of design generally lacks passive stability when operating entirely foilborne. Additionally, such designs generally lack pitch stability when shifting from the foilborne mode to the waterborne mode.

Accordingly, a need remains for a safe, efficient, passively stable hydrofoil supported watercraft designed to operate foilborne or partially hullborne, while maintaining pitch stability when shifting from being foilborne to being hullborne or vice versa.

SUMMARY

It is an object of the present invention to improve watercraft performance and ride characteristics.

A second object of the present invention is to increase watercraft pitch stability.

A third object is to maintain passive control of hydrofoil supported watercraft.

Another object of the invention is to maintain a substantially constant trim angle as watercraft speed increases.

Yet another object is to maintain a smooth stable transition, in a hydrofoil supported watercraft, when the watercraft shifts between foilborne operation and hullborne operation.

A further object is to reduce pitching of a hydrofoil supported watercraft as waves are irregularly engaged by the hull while foilborne.

Still another object is to eliminate underwater mechanical joints and actuators.

Another object is to provide pitch dampening to watercraft in the hullborne phase.

The invention is a passively stable, hydrofoil supported planing watercraft designed and configured to minimize upward pitching motion of the hull under a wide range of operating conditions. For example, the present invention minimizes upward pitching in the following two common situations: (1) pitching that occurs in response to waves being encountered, and (2) pitching that occurs when the dynamic support of the watercraft shifts back and forth between being provided primarily by water pressure against the hull, and being provided primarily by the lifting force generated by at least one main lifting hydrofoil. To accomplish this, he watercraft is designed and constructed so that the line of action of lifting forces acting thereon are directed primarily through the center of gravity of the watercraft, even when the depth of submergence of the hull varies.

The watercraft comprises an elongate hull having a rear stern, a forward bow, and a bottom symmetrically disposed about a centerline keel that extends longitudinally from the stern to the bow. The bottom includes a wetted lifting area which contacts the water as the watercraft travels through the water, wherein water pressure against the wetted lifting area creates a wetted lifting area force that provides upward dynamic support to the watercraft. The wetted lifting area force defining an upwardly directed wetted surface lifting force vector that represents the magnitude and line of action of the wetted surface lifting force.

Further, the present invention includes a fully submerged main lifting foil disposed below the bottom of the watercraft for dynamic support thereof. The main lifting foil has an elongate main strut fixedly attached thereto, that extends upwardly from the main lifting foil to engage the bottom of the hull.

In operation, as the watercraft and main lifting foil move through the water, the main lifting foil generates an upwardly directed main lifting foil force that is transmitted to the hull through the main strut, the upward main foil lifting force therein defining a main foil lifting force vector that represents the magnitude and line of action of the main foil lifting force.

Additionally the invention comprises a transverse step symmetrically disposed about the centerline keel. The step is defined by a recessed surface disposed rearward of the step, and a projecting surface disposed forward of the step. As the speed of the watercraft increases, the rearward recessed surface raises substantially out of the water, thereby decreasing the wetted lifting area, and shifting the wetted lifting area substantially to the projecting surface. Then, as the speed of the watercraft is increased further, the support thereof shifts from being provided primarily by the wetted lifting area force to being provided primarily by the main lifting foil force.

In accordance with another aspect of the invention, a stabilizing foil is provided below the bottom of the watercraft, rearward of the main lifting foil. The stabilizing foil includes a vertically oriented stabilizer strut mounted thereto that extends upwardly from the stabilizing foil to engage the hull of the watercraft. The stabilizing strut is pivotally mounted to the hull of the watercraft to enable fore and aft pivoting of the stabilizer strut about a substantially horizontal axis disposed normal to the centerline keel. A stabilizing strut is so mounted to control the angle of incidence, i.e., angle of attack of the stabilizing foil which in turn controls the trim angle of the watercraft.

In accordance with another aspect of the invention, the step is swept back symmetrically from the centerline keel to form an apex thereon. The step extends rearward from the apex beyond the longitudinal center of gravity of the watercraft thereby extending the projecting surface rearward of the longitudinal center of gravity of the watercraft.

The foregoing and other objects, features and advantages of the invention will become more readily apparent from the following detailed description of a preferred embodiment which proceeds with reference to the drawings.

BRIEF DESCRIPTION OF THE DRAWINGS

FIG. 2 is a side elevation view illustrating a hydrodynamic step, a main lifting foil, a rear stabilizing foil and a center of gravity in accordance with the present invention.

FIG. 3 is a bottom plan view of a watercraft in accordance with the present invention.

FIG. 4 is a partial cross-sectional view of a main foil pivot mechanism.

FIG. 5 is a partial cross-sectional view of a retracting mechanism for a main hydrofoil.

FIG. 6 is a partial top plan of a stabilizing assembly including a rear stabilizing foil and pivot mechanism with phantom lines indicating rotation of the same about a substantially vertical axis.

FIG. 7 is a partial top plan of a stabilizing assembly including a rear stabilizing foil and pivot mechanism with phantom lines illustrating movement of the trailing edge upper rudder about a substantially vertical axis.

FIG. 8 is a rear perspective view of a stabilizing assembly in accordance with the present invention.

DETAILED DESCRIPTION OF PREFERRED EMBODIMENT

Figure 1:
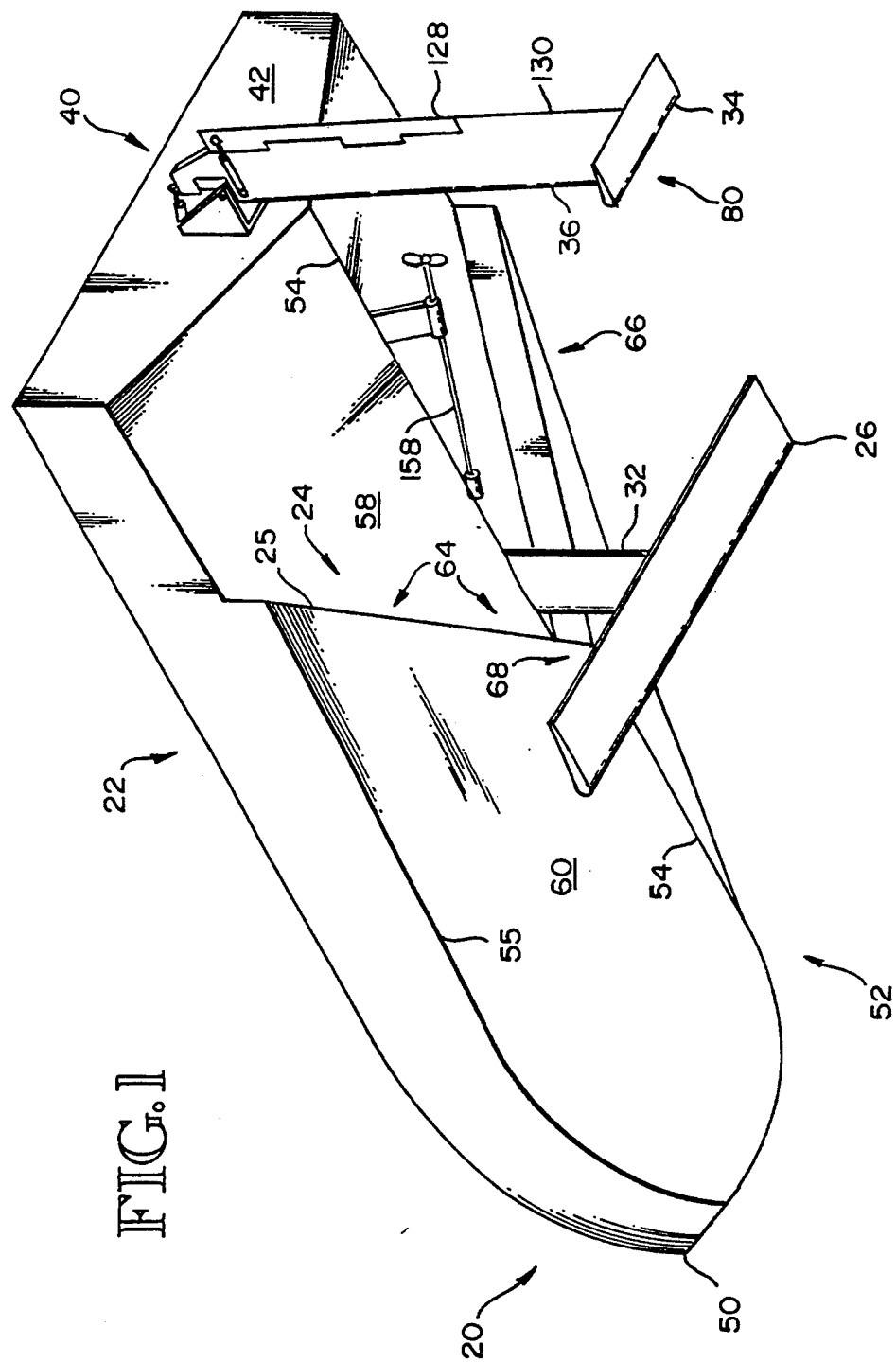
FIG. 1 is a underside rear perspective view of a watercraft in accordance with the present invention.
Figure 9:
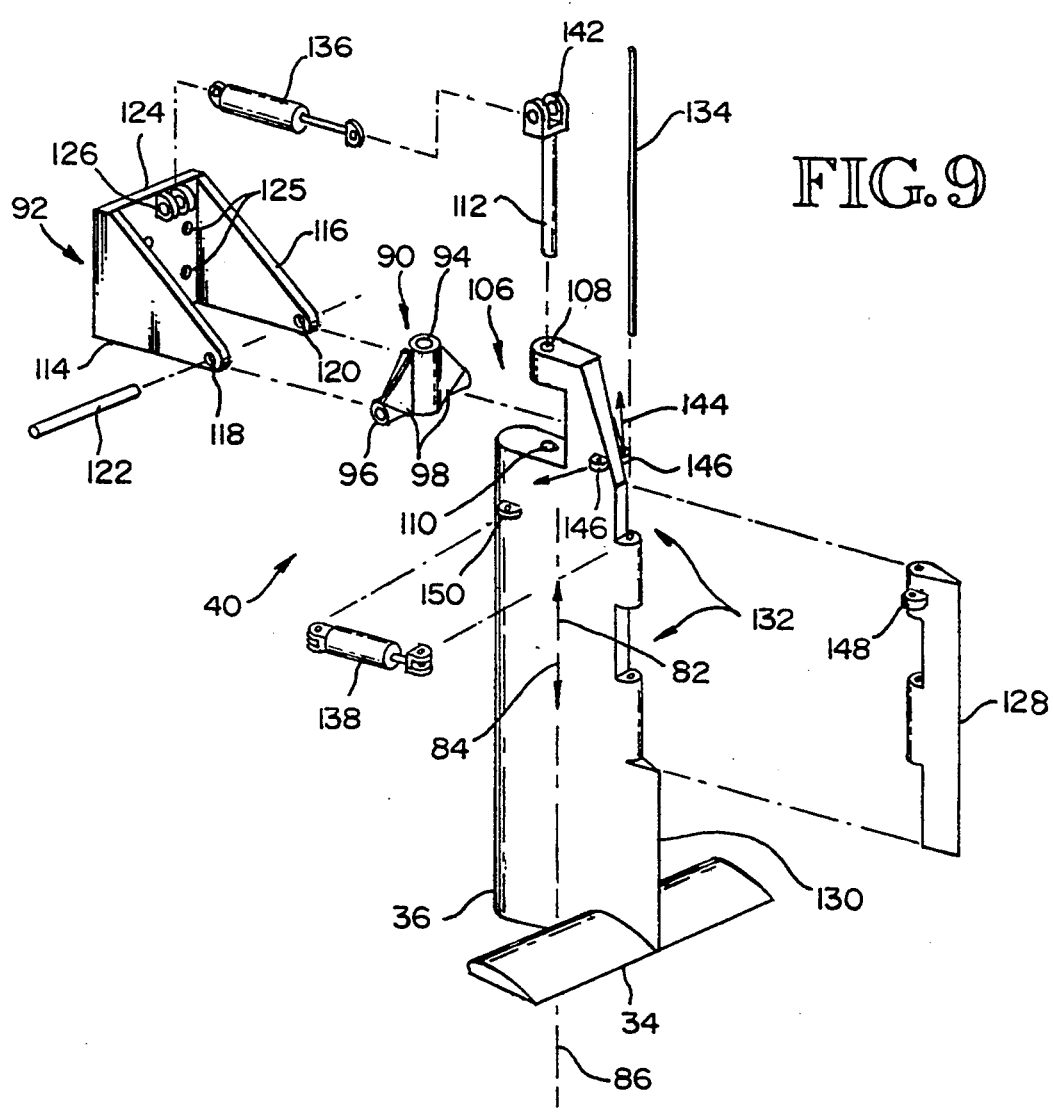
FIG. 9 is an exploded perspective view of the stabilizing foil and related components including a stabilizing strut and trailing edge upper rudder.
Figure 10:
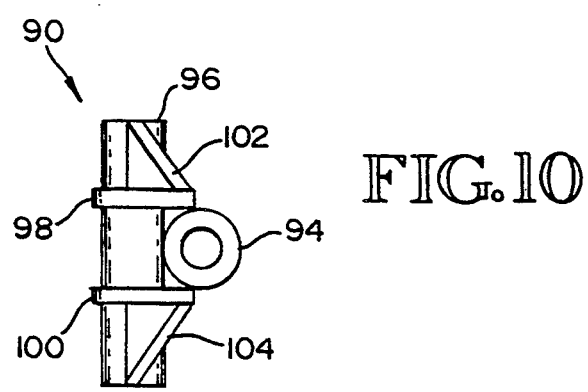
FIG. 10 is a plan view of a strut coupler.

FIGS. 1 through 3 show a preferred embodiment in accordance with the present invention. Indicated generally at 20 is a hydrofoil supported watercraft. The watercraft 20 includes a hull 22 having an integrally formed transverse step 24 that defines a step trailing edge 25. For dynamic lift, a fully submerged, horizontally oriented, main lifting foil 26 is disposed below the hull 22. As will later be more fully explained, the main lifting foil 26 is oriented and secured below the hull 22 in predetermined location that results in the line of action 28 thereof being directed substantially through the center of gravity 30 of the water craft 20, i.e., the main lifting foil force vector that represents the sum of forces generated thereby is directed toward the center of gravity 30. The main lifting foil 26 is attached to the hull 22 by a main strut 32. The main lifting foil is secured in a fixed position and therefore does not require a separate control system.

Additionally, the preferred embodiment of the watercraft 20 includes a rear stabilizing assembly 80 that controls the watercraft about its three primary axes: roll, yaw, and trim angle. Included therein is a rear stabilizing foil 34 secured in place by a substantially vertical stabilizer strut 36 pivotable about its upper end, in a fore and aft direction. Such fore and aft pivoting produces changes in the angle of attack 38 of the stabilizing foil 34 which results in adjustment of the trim angle 44 of the watercraft 20. Accordingly, the trim angle 44 can be controlled and adjusted for optimum performance of the watercraft 20.

To allow force and aft pivoting of the stabilizer strut 36, the same is pivotally attached to a pivot mechanism 40 which is itself attached to the stern 42 of the watercraft 20. Such fore and aft pivoting of the stabilizer strut 36 is passively controlled, i.e., manually controlled, thereby eliminating the need for a complex control system. In this way, the rear stabilizing foil 34 functions to control the trim angle 44, as well as to dampen the pitching of the watercraft 20 caused by waves, and by varying degrees of submergence of the hull 22.

Moreover, as will later be more fully explained, the stabilizer strut 36 is rotatable about its longitudinal axis to enable steering of the watercraft 20, and includes an adjustable trailing edge upper rudder that is rotatable about a substantially parallel axis. It should be appreciated that the relative rotation of the upper rudder 128 can be opposite to the rotation of the stabilizer strut 36. In this way, roll and yaw can be controlled by different combinations of stabilizer strut 36 and upper rudder 128 rotation.

Beyond this, fore and aft pivoting of the stabilizer strut 36 occurs at the pivot mechanism 40 which is disposed above and out of the water. In this way, all movement inducing mechanisms such as actuators, and most pivotable joints that link various components, are located above and out of the water. From a maintenance stand point, this arrangement is superior to those designs that have such devices and joints located below the normal water level.

Additionally, a primary aspect of the overall design of the watercraft 20 is to maintain pitch stability when the hull 22 engages waves, or similarly, when the watercraft 20 is in transition between foilborne and hullborne operation. As will be more fully explained later, such pitch stability is enhanced by having the transverse step 24 swept back. By having the step 24 so configured, the line of action of water pressure 46, at cruising speeds, against the hull 22 is substantially in line with the center of gravity 30. In this way, the transition between hullborne and foilborne operation of the watercraft 20 does not create moment forces on the watercraft 20 that can cause the same to pitch.

Considering now in more detail the structure of the watercraft 20, the hull 22 is generally conventional. Included therein is a forwardly disposed bow 50, a rear stern 42, and a bottom 52 symmetrically disposed about a centerline keel 54 that extends longitudinally from the stern 42 to the bow 50. The Bottom 52 includes a wetted lifting area 56 which contacts the water as the watercraft 20 travels at planing and cruising speeds through the water. As with most conventional hull designs, the bottom 52 extends laterally from the centerline keel 54 to opposing chines 55 and 57.

As more clearly illustrated in FIGS. 1 through 3, the wetted lifting area 56, at planing speeds, is located forward of the step 24. The boundaries of the wetted lifting area 56, at planing speed, are best illustrated in FIG. 3. The forward boundary is the wetted lifting area leading edge 61 which is designated by a pair of phantom lines symmetrically extending from the centerline keel 54 to the step trailing edge 25. The rearward boundary of the wetted lifting area 56 is the step trailing edge 25. It should be appreciated that the wetted lifting area 56 defines the area of the hull 22 that contacts the water for hydrodynamic support at planing and cruising speeds. Further, that such support is the result of water pressure against the hull and is indicated by a wetted lifting area force that defines an upwardly directed wetted lifting area force vector 48. The line of action of water pressure 46 indicates the direction of the wetted lifting area force vector 48.

More specifically, the step 24 is symmetrically formed, extending laterally outward from the centerline keel 54. The step 24 is defined by a recessed surface 58 located rearward of the step 24, and by a projecting surface 60 located forward of the step 24. Further, the projecting surface 60 extends rearward to the step trailing edge 25, and extends forward to the bow. As the speed of the watercraft 20 increases from zero to cruising speed, the recessed surface 58 raises substantially out of the water thereby shifting the wetted lifting area 56 forward of the step 24. This event occurs as the watercraft 20 begins to plane. As the wetted lifting area 56 so shifts, the angle between the bottom 52 and the water surface decreases. This angle is hereinafter referred to as the trim angle 44. Also, it should be understood that both the recessed surface 58 and the projecting surface 60 are each symmetrical about the centerline keel 54 as best illustrated in FIG. 3. Further, as illustrated in FIG. 3, the step trailing edge 25 forms the rearward boundary of the wetted lifting area 56.

In the preferred embodiment, step 24 is integrally formed in the bottom 52 of the hull 22. A step is so formed to reduce the wetted lifting area 56 which thereby reduces the drag created when water flows past the hull 22 as the speed of the watercraft 20 increases to cruising speed. The step 24 is symmetrically formed about the centerline keel 54, and extends rearward of the center of gravity 30.

More specifically, the step 24 is swept back to define opposite projecting surface extensions 64–66 that extend the projecting surface 60 rearward of the center of gravity 30. The swept back angle 67 represents the degree to which the step 24 is swept back, and is defined by the angle between the step trailing edge 25 and a line normal to the longitudinal axis of the watercraft 20. The swept back angle 67 can be as much as 45 degrees and greater. Further, the projecting surface extensions 64–66 are symmetrical about the centerline keel 54, adjacently disposed to form an apex 68 thereon. Accordingly, the projecting surface extensions 64–66 extend rearward from the apex 68. With this configuration, the wetted lifting area 56 is disposed both rearward and forward of the center of gravity 30, in substantially equal proportion. In this way, as the depth of submergence for the hull 22 varies, the line of action of water pressure 46 remains substantially directed through the center of gravity 30 of the watercraft 20, and does not move fore and aft as in conventional planing hull designs. As previously indicated, this reduces moment forces generated when the watercraft shifts from hullborne to foilborne operation or vice versa. Similarly, this configuration reduces moment forces created when the hull 22 engages waves which also cause the submergence of the hull 22 in the water to vary.

To reduce drag produced by water contacting the bottom 52 of the planning watercraft 20, a main lifting foil 26 is installed below the bottom 52 of the watercraft 20. The main lifting foil 26 is fully submerged, and is held in proper position by a main strut 32 that extends downward from the bottom 52 of the hull 22. More specifically, the main strut 32 extends downward from the centerline keel 54. The main lifting foil 26 is positioned along the centerline keel 54 in relation to the hull 22 so that its line of action 28 is directed substantially through the center of gravity 30 of the water craft 20. More specifically, the main lifting foil 26 generates a main lifting foil force that defines a main lifting foil force vector 29. The main lifting foil force vector 29 represents the sum of lifting and drag forces generated by the main lifting foil 26. Accordingly, the main lifting foil force vector 29 is directed substantially through the center of gravity 30 of the water craft 20.

In the preferred embodiment, the main lifting foil 26 is designed to be subcavitating. As such, it is generally planar in shape, having a thin cross-section, and is disposed to lie in a substantially horizontal plane, substantially parallel to the overall longitudinal direction of the hull 22. The main lifting foil 26 is machined from a solid material such as aluminum and is fixedly attached to the main strut 32 similarly formed. The fixed connection between the main strut and the main lifting foil 26 is preferably welded to reduce drag (not shown).

Similarly, the main strut 32, is fixedly attached to the hull 22. Like the main lifting foil 26, the main strut 32 is planar in shape, having a thin cross-section oriented to align its major axis in the direction of travel through the water. The connection between the main strut 32 and the hull 22 can be accomplished in a number of ways including bolting and welding (not illustrated). Accordingly, the main lifting foil 26 has no moving, pivoting or rotating parts, i.e., the main lifting foil 26 is fixed in relation to the hull 22. In this way, complicated main lifting foil controls and control systems are not employed.

Turning again to FIGS. 1–3, and to FIGS. 6–10, a stabilizing assembly 80 is shown mounted to the stern 42. The stabilizing assembly 80 is provided primarily to stabilize the watercraft 20 against pitching, and for control of the watercraft 20 about three axes, i.e., roll, yaw and trim angle. For example, the stabilizing assembly 80 stabilizes the watercraft 20 against pitch movements that occur as the result of unbalanced moment forces on the hull 22 created when the depth of submergence of the same varies as a result of wave action, or as a result of the watercraft 20 shifting between being hullborne and being foilborne. To put it differently, the stabilizing assembly 80 creates counterbalancing dampening forces to assist in resisting pitching forces as noted above. Beyond this, as will be more fully explained below, the stabilizing assembly 80 is provided for the control of roll, yaw, and trim angle adjustment of the watercraft 20.

Attention is directed to FIGS. 6 through 10 for a more detailed description of the structure of the stabilizing assembly 80. Included therein is a horizontally disposed, generally planar stabilizing foil 34 maintained below the hull 22, extending deeper in the water than the main lifting foil 26, to the rear of the main lifting foil 26. For optimum performance, the stabilizing foil 34 is lower in the water than main lifting foil 26.

In the preferred embodiment, the stabilizing foil 34 is machined from a solid material such as aluminum, and is secured in fixed elation to a stabilizer strut 36. The stabilizer strut 36 is similarly machined, and extends upward from the stabilizing foil 34. Like the main strut 23, the stabilizer strut 36 is planar in shape, having a thin cross-section oriented to align its major axis in the direction of travel through the water. To maintain a fixed relation, the stabilizing foil 34 is welded to the stabilizer strut 36 (not shown).

In this way, the angle of attack of the stabilizing foil 34, can be controlled by pivoting the stabilizer strut 36 about the stern 42 in a fore and aft direction. That is, the plane of the stabilizing foil 34 can be adjusted in relation to the direction of the flow of water thereover. Because the stabilizing foil 34 tends to seek a path through the water where the flow of water is substantially in line with the plane of the stabilizing foil 34, the stabilizing foil 34 will create either a positive vertical force 82 (upward) or negative vertical force 84 (downward) along the longitudinal axis 86 of the stabilizer strut 36. Thus the watercraft 20 will trim either bow up or bow down in reaction to positive or negative forces generated by varying the angle of attack of the stabilizing foil 34. Accordingly, an optimum trim angle of the watercraft 20 can be obtained by controlling fore and aft pivoting movement of the stabilizer strut 36.

To enable fore and aft pivoting movement of the stabilizer strut 36, the same is attached to a pivot mechanism 40 which is secured to the stern 42 above the normal water level that occurs when the watercraft 20 is stationary, i.e., the stationary water level. The pivot mechanism 40 is arranged to allow the stabilizer strut 36 to pivot about a substantially horizontal axis disposed normal to the centerline keel 54.

In addition to fore and aft pivoting of the stabilizer strut 36, the pivot mechanism 40 is arranged to enable the stabilizer strut 36 to rotate about its longitudinal axis 86. By enabling such movement, the stabilizer strut 36 can be manipulated to roll the watercraft 20, at cruising speeds, about a longitudinal axis that extends in substantially the direction of travel of the watercraft 20, and to yaw the watercraft about a vertical axis. By initiating a combined roll and yaw, in a starboard (right) or port (left) direction, the watercraft 20 turns in the same direction. Thus the watercraft 20 turns responsive to rotation of the stabilizer strut 36.

To enable controlled pivoting and rotating movements as discussed above, the pivot mechanism 40 includes a strut coupler 90 that links the stabilizer strut 36 to a mounting bracket 92 which is bolted to the stern 42. A strut coupler 90 so provided is typically constructed from two adjacently disposed standard sections of pipe 94–96 joined together. The two pipe sections are joined with their respective axes oriented perpendicular to one another. To reinforce this fixed relationship, a pair of side gusset plates 98–100 and a pair of parallel gusset plates 102–104 fixedly interconnecting the pipe sections are welded thereto.

For rotation of the stabilizer strut 36 about its longitudinal axis 86, the stabilizer strut 36 is rotatingly joined to the vertically oriented pipe section 94 of the strut coupler 90. To make this connection, the upper portion of the stabilizer strut 36 includes a receiving cutout 106 sized to receive the strut coupler 90. Above and below the receiving cutout 106, apertures 108–110 are disposed to receive a vertical strut connection pin 112 therethrough, in coaxial relationship with the strut coupler 90 that is so received. In this way, the stabilizer strut 36 is rotatingly connected to the vertical pipe section 94.

Similarly, the strut coupler 90 is pivotally connected to the mounting bracket 92 to allow fore and aft pivoting of the stabilizer strut 36. For this connection, the mounting bracket 92 includes two opposing vertically oriented bracket support plates 114–116 spaced apart in parallel relation such that the strut coupler 90 can be received therebetween. The support plate 114–116 include apertures 118–120 oriented to receive a horizontal strut connection pin 122 coaxially disposed through the horizontal pipe section 96 of a strut coupler 90 that is so received. For connection to the hull 22, the bracket support plates 114–116 are welded to a bracket mounting plate 124 that is fixed to the stern 42 of hull 22 by a plurality of bolts 125. In this way, the strut coupler 90, and therefore the stabilizer strut 36, is pivotally connected to the stern 42 to enable fore and aft pivoting motion.

Beyond this, to assist in the control of yaw, i.e., rotation of the watercraft 20 about a substantially vertical axis, an upper rudder 128 is incorporated into the trailing edge 130 of the stabilizer strut 36. The upper rudder 128 is designed to rotate about a substantially vertical axis independent of the rotation of the stabilizer strut 36. Accordingly, the upper rudder 128 is rotatingly received into an upper rudder receiving cutout 132 disposed on the trailing edge 130 of the stabilizer strut 36. To rotatingly secure the upper rudder 128 to the stabilizer strut 36, a vertically oriented upper rudder pin 134 is coaxially disposed through vertical bores provided through portions of the upper rudder 128 and the stabilizer strut 36. It should be appreciated that rotating the upper rudder 128 in an opposite direction from the rotation of the stabilizer strut 36, produces a rolling torque or force couple that acts about a substantially horizontal axis oriented in the direction of travel of the watercraft 20. In this way, greater control of roll and yaw is achieved.

Finally, the operator of the watercraft 20 controls the pivoting action of the stabilizer strut 36, and upper rudder 128 rotation by ordinary hydraulic actuators 136–138. To control the pivoting motion of stabilizer strut 36, a pivot actuator 136 is connected between the bracket mounting plate link 126 and the upper link 142 of the vertical strut connection pin 112. To control stabilizer strut 36 rotation, steering cables 144 are connected to a stabilizer steering link 146 disposed on the stabilizer strut 36. It should be appreciated an ordinary hydraulic actuator could be employed to control the stabilizer strut 36 rotation (not illustrated).

Further, upper rudder 128 rotation is similarly initiated by operation of an upper rudder actuator 138 that is connected between the upper rudder bell crank 148 and a stabilizer strut link 150. Accordingly the upper rudder 128 can be independently controlled from the other components of the stabilizer assembly 80.

It should be appreciated that all actuator and steering connection points of the stabilizing assembly 80 are disposed above the normal water level on the stationary watercraft 20. With this arrangement, damage from salt water on the various mechanical parts is minimized, and replacement of such controlling devices is greatly improved.

Attention is directed to FIGS. 4–45 for illustrations of alternate arrangements of the main foil 26. FIG. 4 shows a main strut 32 that is pivotable about a horizontal axis. With this arrangement, the main foil 26 can fold behind the step 24 upward against the recessed surface 58 to permit operation of the watercraft 20 in shallow water. To pivot the main strut between the extended and folded positions a main strut pivot joint 152 having a plurality of bores 153 disposed therethrough is provided. When the main strut 32 is pivoted to the desired position, a plurality of bolts 154 are inserted through matching strut bores (not shown).

Similarly, as illustrated in FIG. 5, an alternate configuration is provided for operation in shallow water that shows the main foil 26 being shiftable between an upward retracted position and an extended coaxial downward position. Here, the main strut 32 travels either upward or downward through opening 156 to the desired position. To fix the main strut 23 in either position, a number of methods could be employed including bolts (not shown).

Finally, it should be appreciated that the primary components including foil sections, strut members, and pivot joints are intended to be manufactured from metal. However, other suitable materials could be employed. Moreover, the manufacturing methods for such components might include machining, extruding, casting, or forming, and would depend upon local manufacturing costs. Additionally, a watercraft 20 as described above could be powered in a number of conventional ways including a standard inboard engine coupled to a straight shaft 158, or by an outboard engine (not shown), a water jet (not shown), or Vee drive power train (not shown).

Having illustrated and described the principles of my invention in a preferred embodiment thereof, it should be readily apparent to those skilled in the art that the invention can be modified in arrangement and detail without departing from such principles. I claim all modifications coming within the spirit and scope of the accompanying claims. Page 25

That which is claimed is:

1. A hydrofoil supported, planing watercraft designed and configured to minimize pitching movement of the hull when the dynamic support thereof shifts back and forth between being provided primarily by water pressure against the hull and being provided primarily by the lifting force generated by at least one main support hydrofoil, the watercraft being passively stable at cruising speeds, the watercraft comprising:

an elongate hull having a rear stern, a forward bow, and a bottom symmetrically disposed about a centerline keel that extends longitudinally from the stern to the bow, the bottom having a wetted lifting area which contacts the water as the watercraft travels hullborne through the water, wherein water pressure against the wetted lifting area creates a wetted lifting area force that provides dynamic support to the watercraft, wherein the wetted lifting area force defines an upwardly directed wetted lifting area force vector;

a fully submerged main lifting foil disposed below the bottom of the watercraft, the main lifting foil having an elongate main strut attached thereto, said main strut extending upwardly from the main lifting foil to engage the bottom of the hull, wherein as the watercraft moves through the water, said main lifting foil creates an upwardly directed main lifting foil force that is transmitted through the main strut to the hull for dynamic support thereof, wherein the main lifting foil force defines an upwardly directed main lifting foil force vector; and the elongate hull further comprising a transverse step symmetrically disposed about the centerline keel, the step being defined by a recessed surface disposed rearward of the step, and a projecting surface disposed forward of the step, wherein as the speed of the watercraft increases, the rearward recessed surface raises substantially out of the water, thereby decreasing the wetted lifting area, and shifting the wetted lifting area substantially forward to the projecting surface.

2. A watercraft as recited in claim 1 wherein the step is swept back symmetrically from the centerline keel, the swept back step forming an apex disposed on the centerline keel, the step being swept back such that the projecting surface extends rearward of the longitudinal center of gravity of the watercraft.

3. A watercraft as recited in claim 1 wherein the main foil is longitudinally disposed in relation to the bottom of the watercraft such that the main lifting foil force vector is directed substantially through the longitudinal center of gravity of the watercraft.

4. A watercraft as recited in claim 3 further comprising a stabilizing foil disposed below the bottom of the watercraft, rearward of the main lifting foil, the stabilizing foil having a vertically oriented stabilizer strut mounted thereto, said stabilizer strut extending upward from the stabilizing foil to pivotally engage the watercraft.

5. A watercraft as recited in claim 4 further comprising a pivot mechanism attached to the hull, said stabilizer strut engaging the pivot mechanism to enable fore and aft pivoting of the stabilizer strut about a substantially horizontal axis disposed normal to the centerline keel.

6. A watercraft as recited in claim 5 wherein the pivot mechanism is attached to the stern of the watercraft, above the stationary water level.

7. A watercraft as recited in claim 6 wherein the stabilizer strut is rotatingly connected to the pivot mechanism to enable rotation about a substantially vertical axis.

8. A watercraft as recited in claim 7 further comprising means for rotating said stabilizer strut about a substantially vertical axis.

9. A watercraft as recited in claim 7 wherein the stabilizer strut further comprises a trailing edge upper rudder, the trailing edge upper rudder being independently rotatable about an axis parallel to the axis of rotation of the stabilizer strut.

10. A watercraft as recited in claim 5 further comprising means for pivoting said stabilizer strut fore and aft.

11. A watercraft as recited in claim 3 wherein the main strut is pivotally connected to the bottom of the hull to enable fore and aft pivoting of the main lifting strut about a substantially horizontal axis disposed normal to the centerline keel.

12. A watercraft as recited in claim 1 further comprising means for thrust to move the watercraft through the water.

13. A hydrofoil assisted watercraft that is passively stable at cruising speeds, the watercraft comprising:

an elongate hull having a rear stern; a forward bow, and a bottom symmetrically disposed about a centerline keel that extends longitudinally from the stern to the bow, the bottom having a wetted lifting area which contacts the water as the watercraft travels hullborne through the water, wherein water pressure against the wetted lining area creates a wetted lifting area force that provides dynamic support to the watercraft, wherein the wetted lifting area force defines an upwardly directed wetted lifting area force vector;

a fully submerged main lifting foil disposed below the bottom of the watercraft, the main lifting foil having an elongated main strut attached thereto, said main strut extending upwardly from the main lifting foil to engage the bottom of the hull, wherein as the watercraft moves through the water, said main lifting foil creates an upwardly directed main lifting foil force that is transmitted through the main strut to the hull for dynamic support thereof, wherein the main lifting foil force defines an upwardly directed main lifting foil force vector;

a stabilizing foil disposed below the bottom of the watercraft, rearward of the main lifting foil, the stabilizing foil having a vertically oriented stabilizer strut mounted thereto, said stabilizer strut extending upward from the stabilizing foil to pivotally engage the watercraft;

the main foil being longitudinally disposed in relation to the bottom of the watercraft such that the main lifting foil force vector is directed substantially through the longitudinal center of gravity Of the watercraft; and a transverse step symmetrically disposed about the centerline keel, the step being defined by a recessed surface disposed rearward of the step, and a projecting surface disposed forward of the step, wherein as the speed of the watercraft increases, the rearward recessed surface raises substantially out of the water, thereby decreasing the wetted lifting area, and shifting the wetted lifting area substantially forward to the projecting surface.

14. A watercraft as recited in claim 13 wherein the step is swept back symmetrically from the centerline keel such that the projected surface extends rearward of the longitudinal center of gravity of the watercraft.

15. A hydrofoil assisted watercraft that is passively stable at cruising speeds, the watercraft comprising:
an elongate hull having a rear stern, a forward bow, and a bottom symmetrically disposed about a centerline keel that extends longitudinally from the stern to the bow, the bottom having a wetted lifting area which contacts the water as the watercraft travels hullborne through the water, wherein water pressure against the wetted lifting area creates a wetted lifting area force that provides dynamic support to the watercraft, wherein the wetted lifting area force defines an upwardly directed wetted lifting area force vector;
a fully submerged main lifting foil disposed below the bottom of the watercraft, the main lifting foil having an elongate main strut attached thereto, said main strut extending upwardly from the main lifting foil to engage the bottom of the hull, wherein as the watercraft moves through the water, said main lifting foil creates an upwardly directed main lifting foil force that is transmitted through the main strut to the hull for dynamic support thereof, wherein the main lifting foil force defines an upwardly directed main lifting foil force vector;
a stabilizing foil disposed below the bottom of the watercraft, rearward of the main lifting foil, the stabilizing foil having a vertically oriented stabilizer strut mounted thereto, said stabilizer strut extending upward from the stabilizing foil to pivotally engage the watercraft;
the main foil being longitudinally disposed in relation to the bottom of the watercraft such that the main lifting foil force vector is directed substantially through the longitudinal center of gravity of the watercraft; and
a pivot mechanism attached to the hull of the watercraft, said stabilizer strut engaging the pivot mechanism to enable fore and aft pivoting of the stabilizer strut about a substantially horizontal axis disposed normal to the centerline keel.

16. A watercraft as recited in claim 15 wherein the stabilizer strut is rotatingly connected to the pivot mechanism, the stabilizer strut being rotatable about a substantially vertical axis.

17. A watercraft as recited in claim 16 wherein the stabilizer strut further comprises a trailing edge upper rudder, the trailing edge upper rudder being independently rotatable about an axis parallel to the axis of rotation of the stabilizer strut.

18. A hydrofoil assisted, planing watercraft designed and configured to minimize pitching movement of the hull when the dynamic support thereof shifts back and forth between being provided primarily by water pressure against the hull and being provided primarily by at least one hydrofoil, the watercraft being passively stable at cruising speeds, the watercraft comprising:
an elongate hull having a rear stern, a forward bow, and a bottom symmetrically disposed about a centerline keel that extends longitudinally from the stern to the bow, the bottom having a wetted lifting area which contacts the water as the watercraft travels hullborne through the water, wherein water pressure against the wetted lifting area creates a wetted lifting area force that provides dynamic support to the watercraft, wherein the wetted lifting area force defines an upwardly directed wetted lifting area force vector;
means for thrust to move the watercraft through the water;
a fully submerged main lifting foil disposed below the bottom of the watercraft, the main lifting foil having an elongate main strut attached thereto, said main strut extending upwardly from the main lifting foil to engage the bottom of the hull, wherein as the watercraft moves through the water, said main lifting foil generates an upwardly directed main lifting foil force that is transmitted through the main strut to the hull for dynamic support thereof, wherein the main lifting foil force defines an upwardly directed main lifting foil force vector;
the elongate hull further comprising a transverse step symmetrically disposed about the centerline keel, the step being defined by a recessed surface disposed rearward of the step, and a projecting surface disposed forward of the step, wherein as the speed of the watercraft increases, the rearward recessed surface raises substantially out of the water, thereby shifting the wetted lifting area substantially forward to the projecting surface;
a stabilizing foil disposed below the bottom of the watercraft, rearward of the main lifting foil, the stabilizing foil having a vertically oriented stabilizer strut mounted thereto, said stabilizer strut extending upward from the stabilizing foil to a pivot mechanism attached to the hull of the watercraft, said stabilizer strut being pivotally connected to the pivot mechanism to enable fore and aft pivoting of the stabilizer strut about a substantially horizontal axis disposed normal to the centerline keel; and
the main foil being longitudinally disposed in relation to the bottom of the watercraft such that the main lifting foil force vector is directed substantially through the longitudinal center of gravity of the watercraft.

19. A watercraft as recited in claim 18 wherein the stabilizer strut further comprises a trailing edge upper rudder, the trailing edge upper rudder being independently rotatable about an axis parallel to the axis of rotation of the stabilizer strut.

* * * * *